Patented May 29, 1928.

1,671,596

UNITED STATES PATENT OFFICE.

FELIX LAUTER, OF PHILADELPHIA, PENNSYLVANIA, ASSIGNOR TO ROHM & HAAS COMPANY, A CORPORATION OF DELAWARE.

RESINOUS REACTION PRODUCT OF UREA AND FORMALDEHYDE.

No Drawing. Application filed May 7, 1926. Serial No. 107,491.

It has been known for many years that resin-like substances can be produced by causing a reaction to take place between urea and formaldehyde, and there have always been indications that it is possible by this reaction to produce bodies which were practically glass-clear, but as a practical matter it has been found that the product was at best slightly clouded. Usually the clouded effects would be more or less localized, with transparent masses between the clouded portions.

I have discovered that this clouded effect is due to the formation of methylene urea in the product, and the present invention relates to the production of resinous bodies of the type described which are free from this impurity. Methylene urea is of a crystalline nature instead of being resinous, and will not act like a resinous body, even under the influence of heat and pressure. The benefits of this invention are primarily apparent in connection with the production of transparent bodies, but even if non-transparent resinous bodies are to be made, as for example in making moulding mixtures, the presence of methylene urea is disadvantageous, as it tends to weaken the strength of the product.

I have found that the production of methylene urea can be avoided if the urea is added gradually, while hot, to a boiling formaldehyde solution. If the two substances are mixed in a cold state and allowed to stand, the methylene urea will form at the end of several hours, but if the two are mixed cold and then heated to bring on the condensation reaction, the methylene urea is formed immediately. It is essential to prevent the formation of this impurity that the formaldehyde solution be brought to a boil and that the urea be previously heated to prevent local cooling. The formaldehyde may be in the form of an aqueous solution and the urea is preferably dissolved and heated in solution.

It is desirable that the urea be added slowly and in regulated quantities, as otherwise localized action may take place, which may be accompanied by the formation of methylene urea.

It is to be understood that this invention is applicable to the recognized equivalents of urea and formaldehyde.

What I claim is:

1. The process of forming resinous reaction products of urea and formaldehyde which are free from methylene urea, which comprises the step of adding hot urea to a boiling solution of formaldehyde.

2. A process as defined in claim 1, in which the urea is added in the form of a hot solution.

3. A process as defined in claim 1, in which the urea is in the form of a hot solution and is added gradually to the boiling solution of formaldehyde.

FELIX LAUTER.